(12) United States Patent
Turley

(10) Patent No.: US 10,793,106 B2
(45) Date of Patent: Oct. 6, 2020

(54) AUTOMOBILE TRACKING AND NOTIFICATION DEVICE AND SERVICE

(71) Applicant: Robert Turley, Raleigh, NC (US)

(72) Inventor: Robert Turley, Raleigh, NC (US)

( * ) Notice: Subject to any disclaimer, the term of this patent is extended or adjusted under 35 U.S.C. 154(b) by 0 days.

(21) Appl. No.: 16/180,310

(22) Filed: Nov. 5, 2018

(65) Prior Publication Data

US 2020/0139929 A1    May 7, 2020

(51) Int. Cl.

| | |
|---|---|
| *G08G 1/123* | (2006.01) |
| *B60R 25/102* | (2013.01) |
| *B60R 25/04* | (2013.01) |
| *G07C 5/00* | (2006.01) |
| *B60R 25/40* | (2013.01) |
| *B60R 25/30* | (2013.01) |
| *B60R 25/34* | (2013.01) |
| *G01S 19/16* | (2010.01) |
| *H04W 4/48* | (2018.01) |
| *B60R 25/33* | (2013.01) |
| *B60R 25/10* | (2013.01) |

(52) U.S. Cl.
CPC ............ *B60R 25/102* (2013.01); *B60R 25/04* (2013.01); *B60R 25/30* (2013.01); *B60R 25/33* (2013.01); *B60R 25/34* (2013.01); *B60R 25/403* (2013.01); *G01S 19/16* (2013.01); *G07C 5/008* (2013.01); *G08G 1/123* (2013.01); *H04W 4/48* (2018.02); *B60R 2025/1016* (2013.01); *B60R 2325/205* (2013.01)

(58) Field of Classification Search
CPC ....... B60R 25/102; B60R 25/04; B60R 25/30; B60R 25/33; B60R 25/34; B60R 25/403; B60R 2025/1016; B60R 2325/205; H04W 4/48; G01S 19/16; G07C 5/008; G08G 1/123
See application file for complete search history.

(56) References Cited

U.S. PATENT DOCUMENTS

| 5,939,975 | A | * | 8/1999 | Tsuria | ..................... B60R 25/33 |
| | | | | | 340/426.18 |
| 6,298,306 | B1 | * | 10/2001 | Suarez | .................. G01S 5/0018 |
| | | | | | 701/300 |
| 9,749,470 | B1 | * | 8/2017 | Lockenour | .............. H04W 4/48 |
| 10,157,423 | B1 | * | 12/2018 | Fields | ............... B60W 50/0205 |
| RE47,225 | E | * | 2/2019 | Flick | ........................ G08B 5/36 |
| 2002/0008644 | A1 | * | 1/2002 | Flick | ..................... B60R 25/102 |
| | | | | | 340/988 |
| 2002/0008645 | A1 | * | 1/2002 | Flick | ..................... B60R 25/102 |
| | | | | | 340/988 |
| 2002/0013660 | A1 | * | 1/2002 | Flick | .................. B60R 25/2009 |
| | | | | | 701/519 |

(Continued)

*Primary Examiner* — Quang Pham
(74) *Attorney, Agent, or Firm* — NK Patent Law

(57) ABSTRACT

An automobile tracking and notification device and an associated communication system provide numerous safety and convenience features that ease the stress of daily operation of an automobile. The device provides functionality for monitoring the location of the vehicle and providing real-time location updates to the user; detecting when the vehicle is being towed or stolen and providing real-time alerts to the user and/or to local authorities; detecting when the vehicle is involved in an accident and alerting nearby authorities; and providing information and guidance relating to diagnostic trouble codes.

6 Claims, 9 Drawing Sheets

(56) References Cited

U.S. PATENT DOCUMENTS

| | | | | |
|---|---|---|---|---|
| 2002/0014977 A1* | 2/2002 | Flick | | B60R 25/104 340/988 |
| 2002/0014978 A1* | 2/2002 | Flick | | B60R 25/04 340/988 |
| 2002/0016673 A1* | 2/2002 | Flick | | G08G 1/127 701/484 |
| 2002/0020575 A1* | 2/2002 | DeLuca | | B60T 17/18 180/275 |
| 2002/0021242 A1* | 2/2002 | Flick | | B60R 25/04 342/357.395 |
| 2002/0036566 A1* | 3/2002 | Isobe | | B60R 25/33 340/426.11 |
| 2002/0101365 A1* | 8/2002 | Flick | | B60R 25/04 340/988 |
| 2002/0101366 A1* | 8/2002 | Flick | | B60R 25/102 340/988 |
| 2002/0105442 A1* | 8/2002 | Flick | | G01S 19/34 340/988 |
| 2002/0105444 A1* | 8/2002 | Flick | | G08G 1/205 340/988 |
| 2002/0123353 A1* | 9/2002 | Savoie | | B60R 25/33 455/456.5 |
| 2002/0163449 A1* | 11/2002 | Flick | | G08B 5/36 340/988 |
| 2003/0034915 A1* | 2/2003 | Sasaki | | B60R 25/102 342/357.4 |
| 2003/0050038 A1* | 3/2003 | Haave | | B60R 25/33 455/404.1 |
| 2004/0010370 A1* | 1/2004 | Iijima | | B60R 25/33 701/517 |
| 2004/0130440 A1* | 7/2004 | Boulay | | B60R 25/305 340/426.1 |
| 2005/0231335 A1* | 10/2005 | Miller, Jr. | | B60R 25/1004 340/426.18 |
| 2006/0132294 A1* | 6/2006 | Spark | | G08B 13/19647 340/426.1 |
| 2006/0164217 A1* | 7/2006 | Bourgine De Meder | | B60R 25/25 340/432 |
| 2007/0167147 A1* | 7/2007 | Krasner | | G08G 1/205 455/404.2 |
| 2007/0279283 A1* | 12/2007 | Flick | | G08G 1/205 342/357.31 |
| 2008/0117079 A1* | 5/2008 | Hassan | | B60R 25/045 340/901 |
| 2009/0051510 A1* | 2/2009 | Follmer | | G07C 5/0808 340/425.5 |
| 2009/0189750 A1* | 7/2009 | Chen | | B60R 25/1001 340/426.1 |
| 2010/0228425 A1* | 9/2010 | Tanaka | | B60R 25/102 701/31.4 |
| 2011/0148713 A1* | 6/2011 | D'Avello | | G01S 19/215 342/457 |
| 2011/0184789 A1* | 7/2011 | Kirsch | | H04W 4/029 705/14.1 |
| 2012/0282906 A1* | 11/2012 | Frye | | H04W 4/40 455/414.2 |
| 2013/0019279 A1* | 1/2013 | Aida | | H04W 4/60 726/3 |
| 2013/0138591 A1* | 5/2013 | Ricci | | G06F 3/017 706/46 |
| 2013/0196612 A1* | 8/2013 | Cepuran | | G08B 21/025 455/404.1 |
| 2014/0028477 A1* | 1/2014 | Michalske | | G08G 1/005 340/990 |
| 2014/0279293 A1* | 9/2014 | Morgan | | G07C 5/0858 705/28 |
| 2015/0258961 A1* | 9/2015 | Doherty | | B60R 25/1012 701/2 |
| 2016/0019785 A1* | 1/2016 | Zhang | | G01C 21/3688 340/905 |
| 2017/0330402 A1* | 11/2017 | Menard | | B60R 25/241 |
| 2017/0349143 A1* | 12/2017 | Menard | | H04L 9/3271 |
| 2018/0347531 A1* | 12/2018 | Tamane | | H04W 76/19 |
| 2019/0147311 A1* | 5/2019 | Purba | | G06K 19/047 340/572.1 |

* cited by examiner

AUTOMOBILE TRACKING AND NOTIFICATION DEVICE AND SERVICE

TECHNICAL FIELD

Embodiments described herein relate generally to systems, methods, and apparatuses for an automobile tracking and notification device that allows a user to track their vehicle at all times and that disables the vehicle when it detects the vehicle is being or has been stolen.

BACKGROUND

Automobiles have become a way of life in many places, and they provide convenience, but they also come with some downsides. As one example, people sometimes "lose" their vehicles, either because they forgot where they parked or because they parked illegally and their vehicle was towed. As another example, people in vehicles can be involved in an accident, which can be both scary and dangerous. As another example, maintenance of vehicles can be time-consuming and anxiety-inducing. If an owner of a vehicle does not properly maintain the vehicle, they experience a check-engine light that needs to be addressed. As another example, many vehicles are stolen each year. In 2016, for example, over 765,000 vehicles were stolen in the United States alone. As another example, people worry when their children or other loved ones borrow their vehicles, both for the safety of the people borrowing the vehicle and for the well-being of the vehicle. As another example, modern vehicles include complex on-board computer systems and/or smart keys/keyless-entry systems, all of which raise concerns about hacking.

Accordingly, a need exists for a new and innovative way to track, communicate with, and ease other aspects of the burden of car ownership (e.g. lost cars, stolen cars, towed cars, wrecked cars, and cars needing maintenance).

SUMMARY

The present invention provides systems, methods, and apparatuses for an automobile tracking and notification device that allows a user to track their vehicle at all times and that can disable the vehicle if it detects the vehicle has been stolen or is currently in the process of being stolen.

According to one embodiment of the present invention, an automobile tracking and notification device for tracking a vehicle is disclosed. The automobile tracking and notification device includes a memory. The automobile tracking and notification device includes a GPS chip configured to determine a location of the device. The automobile tracking and notification device includes a processor configured to track the location of the device based on information from the GPS chip and generate notifications related to operation of the vehicle. The automobile tracking and notification device includes a cellular transceiver configured to transmit the notifications related to the operation of the vehicle. The automobile tracking and notification device includes a communications interface configured to provide communications one or more computer systems of the vehicle. The automobile tracking and notification device includes a power input.

In one embodiment of the automobile tracking and notification device, the communications interface includes an immobilizer-unit control interface configured to provide a disable signal to an immobilizer unit of a vehicle such that the vehicle is disabled.

In one embodiment of the automobile tracking and notification device, the communications interface includes an interface configured to communicate with an OBD-II port of the vehicle to receive one or more diagnostic codes from the vehicle.

In one embodiment of the automobile tracking and notification device, the communications interface includes an interface configured to communicate with a vehicle's on-board computer to receive information relating to the operation of the vehicle.

In one embodiment, the automobile tracking and notification device further includes an auxiliary power supply.

In one embodiment of the automobile tracking and notification device, the power input is configured to receive power from a vehicle's power system.

In one embodiment, the automobile tracking and notification device further includes a mounting bracket.

According to one embodiment of the present invention, a method of providing an automobile tracking and notification service for a vehicle is disclosed. The method includes determining whether the vehicle is running. The method includes entering a standby mode upon a determination that the vehicle is not running. The method includes entering an active mode upon a determination that the vehicle is running.

In one embodiment of the method, the standby mode includes checking a location of the vehicle using a GPS chip on a first periodic interval. The standby mode further includes sending the location of the vehicle to a back-end system on a second periodic interval. The standby mode further includes determining whether the vehicle has moved based on the location. The standby mode further includes, upon a determination that the vehicle has moved, sending an alert to the back-end system over a cellular connection and sending a disable signal to the vehicle over an immobilizer unit control interface. The standby mode further includes responding to a user request received from the back-end system.

In one embodiment of the method, the active mode includes checking a location of the vehicle using a GPS chip and sending the location of the vehicle to a back-end system on a periodic interval. The active mode includes sending an alert to the back-end system in response to detecting that one or more airbags of the vehicle have been deployed. The active mode includes sending a diagnostic code to the back-end system in response to receiving the diagnostic code from the vehicle over a communication interface. The active mode includes responding to a user request received from the back-end system.

In one embodiment of the method, the disable signal is sent in response to a user request received from the back-end system.

In one embodiment of the method, the alert includes a last-known location of the vehicle.

In one embodiment, the method further includes translating, at the back-end system, the diagnostic code.

In one embodiment of the method, the alert includes a last-known location of the vehicle.

According to one embodiment of the present invention, a system for tracking a vehicle and providing notifications relating to the vehicle is disclosed. The system includes an automobile tracking and notification device. The system includes an auxiliary power supply. The system includes a back-end system. The system includes a mobile application configured to operate on a mobile device.

In one embodiment of the system, the automobile tracking and notification device includes a communications interface configured to send a disable signal to the vehicle.

In one embodiment of the system, the automobile tracking and notification device is configured to receive power from a power system of the vehicle and from the auxiliary power supply.

In one embodiment of the system, the back-end system includes a database configured to store information related to one or more users of a service.

In one embodiment of the system, the back-end system is configured to generate an alert and send the alert to local authorities.

In one embodiment of the system, the back-end system is configured to translate a diagnostic code into instructions for a user.

The features and advantages described in this summary and the following detailed description are not all-inclusive. Many additional features and advantages will be apparent to one of ordinary skill in the art in view of the drawings, specification, and claims presented herein.

BRIEF DESCRIPTION OF THE DRAWINGS

The present embodiments are illustrated by way of example and are not intended to be limited by the figures of the accompanying drawings. In the drawings.

DETAILED DESCRIPTION

Figure 1:
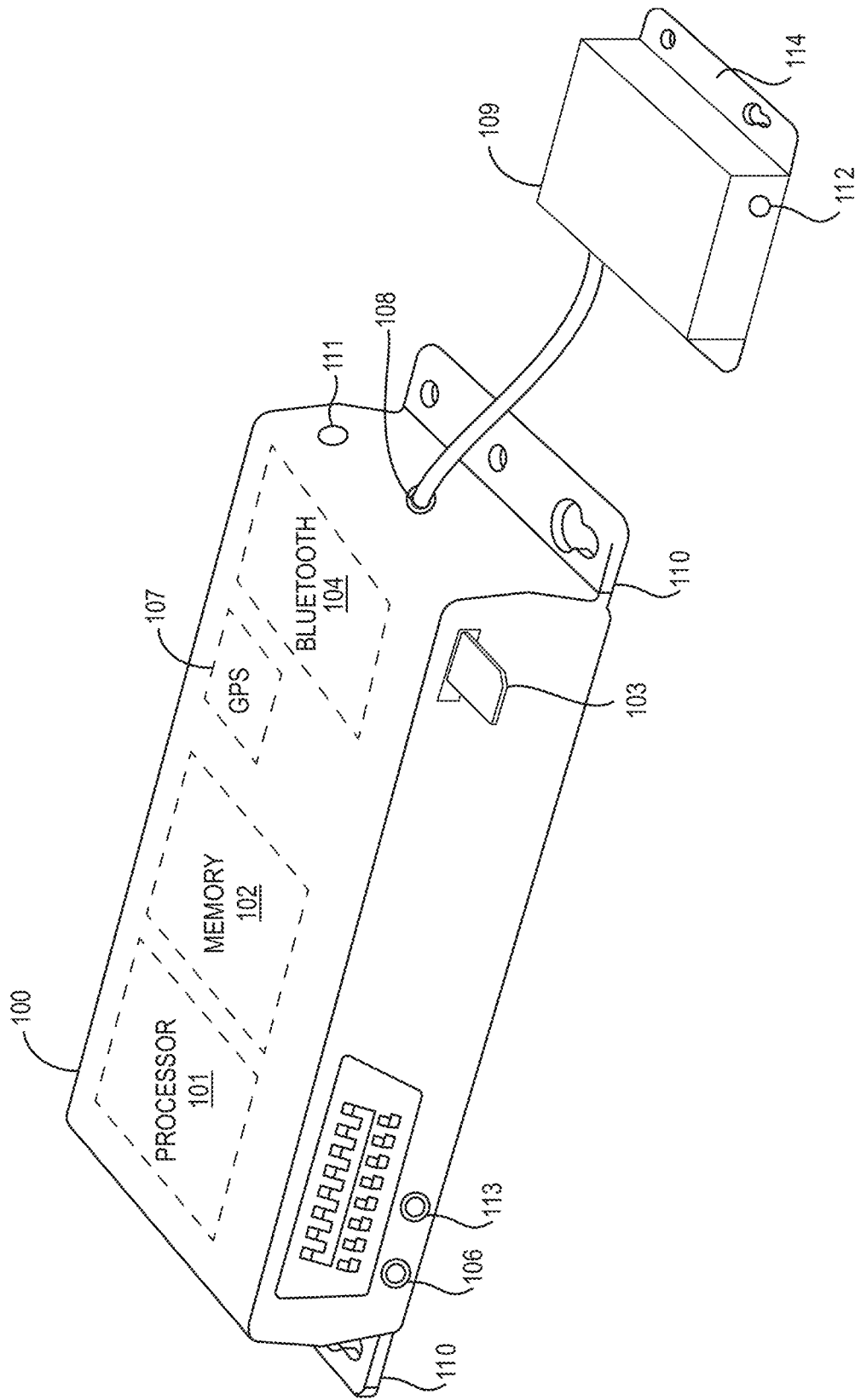
FIG. 1 depicts a block diagram of an exemplary architecture of the automobile tracking and notification device.

The following description and figures are illustrative and are not to be construed as limiting. Numerous specific details are described to provide a thorough understanding of the disclosure. In certain instances, however, well-known or conventional details are not described in order to avoid obscuring the description. References to "one embodiment" or "an embodiment" in the present disclosure may be (but are not necessarily) references to the same embodiment, and such references mean at least one of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. It will be appreciated that same thing can be said in more than one way.

Alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification, including examples of any terms discussed herein, is illustrative only, and is not intended to further limit the scope and meaning of the disclosure or of any exemplified term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions, will control.

As will be described in greater detail below with reference to the figures, the subject matter described herein provides new systems, methods, and apparatuses for an automobile tracking and notification device that allows a user to track their vehicle at all times and that disables the vehicle when it detects the vehicle is being or has been stolen.

The automobile tracking device and its associated communication system provide a number of key functionalities to users. First, the automobile tracking device and its associated communication system provides location services for the user's automobile. The location services include, for example, keeping track of where the vehicle is parked (so that the user doesn't forget where they parked), locating and/or tracking the vehicle if it is towed, locating and/or tracking the vehicle if it is stolen, tracking the vehicle when it is being used by somebody other than the user (e.g., a family member or friend), and providing an SOS beacon (which is triggered upon air-bag deployment) that gives the location of an accident to first responders and/or family members.

Second, the system and automobile tracking device provides stolen-car services. The stolen-car services may include, for example, real-time location information, and direct reporting to the police when a vehicle is reported stolen.

Third, the automobile tracking device and its associated communication system provide communication services to users. The communication services include, for example, real-time notifications relating to the location services, real-time notifications relating to the stolen-car services, communications relating to the engine-code reader, and an SOS beacon in the event of an accident.

FIG. 1 depicts a block diagram of an exemplary architecture of the automobile tracking and notification device.

Referring to FIG. 1, the automobile tracking and notification device 100 is a relatively small device that fits behind the dashboard of a vehicle. The automobile tracking device 100 can be integrated into the vehicle in any location as desired, within the scope of this disclosure. The automobile tracking and notification device 100 includes a mounting bracket 110 for mounting it in the host vehicle. The mounting bracket may be of any type/shape known in the art. As explained in more detail below, the automobile tracking and notification device 100 is a hardware device integrated into a system that is accessible through a mobile application or a web-based user interface/application. In some embodiments, the device may be an Internet of Things device.

The automobile tracking and notification device 100 includes a processor 101. The processor 101 runs software that implements aspects the functionality described herein. The processor may run any operating system or embedded software. In one embodiment, the processor may run a Linux-based operating system.

The automobile tracking and notification device 100 includes an internal memory 102. The internal memory 102 may store data relating to the device, the associated vehicle, and/or the user. In addition, the internal memory 102 may store instructions that are executed by the processor 101. The internal memory 102 may store updates to the software and/or updates to the device data. In one embodiment, the internal memory 102 is solid-state memory device with at least 64 GB of storage. In other embodiments, the internal memory may be other types and/or sizes.

The automobile tracking and notification device 100 has an associated unique identification code. Each automobile tracking and notification device 100 is specific to a particular vehicle and is keyed to that particular vehicle's VIN. In one embodiment, the unique authentication code is the same as the automobile's VIN, so that the device can be easily matched to the automobile. The unique identification code may be stored in the internal memory 102, or it may be hardcoded into the hardware of the device. The unique identification code associated with the device must be provided to the mobile application and/or web-based interface to verify the device and link it to the associated vehicle. Once the unique identification code has been entered into the mobile application/web-based interface, the code is deactivated in the system such that it cannot be paired with any other user account(s). Once the automobile tracking and notification device has been paired with the user's account and activated, the user may share access to the device with other users (e.g., family, friends, next purchaser of the automobile, etc.) through the mobile application and/or the web-based interface. Shared access is managed using permissions, and the original owner of the automobile may revoke or modify shared access at any time.

The software on the automobile tracking and notification device may be updated, either automatically (i.e., using a "push" functionality) or manually (i.e., using a "pull" functionality). The automatic updates may occur over a cellular network (e.g., Verizon, AT&T, etc.) when updates are available.

The automobile tracking and notification device 100 includes cellular network connectivity, such as 3G and/or 4G connectivity. The cellular connectivity may be provided by a SIM card and/or cellular transceiver 103. The cellular connectivity allows the device to communicate with the system associated with the automobile tracking and notification device 100.

The automobile tracking and notification device 100 includes an interface 105 that connects to the automobile's on-board diagnostics system ("OBD-II"). Modern automobiles include an on-board diagnostics system, and OBD-II is a standardized communication protocol for the on-board diagnostic system. The OBD-II port is usually located underneath the dash on the left side of the driver's footwell. The on-board diagnostics system sends diagnostic trouble codes ("DTC"), which are standardized codes made up of a letter and four digits, though the OBD-II port. The automobile tracking and notification device 100 connects to its host vehicle through the OBD-II interface 105. This connection may be made at the vehicle's OBD-II connector, or it may be tied-in "upstream" in the wiring, such that the OBD-II connector is still available for the owner of the vehicle to use separately from the automobile tracking and notification device 100.

The automobile tracking and notification device 100 receives or reads DTCs from the vehicle's on-board diagnostics system. Although the automobile tracking and notification device 100 can receive or read DTCs from the vehicle's on-board diagnostics system, it cannot send any data to the computer, which is to minimize the possibility of gaining unauthorized access (e.g., "hacking") the vehicle through the automobile tracking and notification device 100. In one embodiment, the automobile tracking and notification device 100 may be prevented from sending data to the vehicle's on-board diagnostics system by using a unidirectional cable that only allows data to flow in one direction (i.e., from the vehicle's on-board diagnostics system to the device).

As mentioned above, the automobile tracking and notification device 100 may also be configured to monitor the vehicle to detect when the vehicle's airbags have been deployed. This monitoring may occur through different systems depending on the type of vehicle in which the automobile tracking and notification device 100 is installed. For example, the monitoring may occur through the vehicle's safety restraint system (SRS), the vehicle's on-board computer, or the vehicle's on-board diagnostics system (via the OBD-II interface 105). The on-board computer interface 106 allows the automobile tracking and notification device 100 to connect to the vehicle's on-board computer for the purpose of monitoring airbag deployment when it is not available through the OBD-II interface 105.

The automobile tracking and notification device 100 includes a GPS chip 107 for determining the location of the vehicle.

The automobile tracking and notification device 100 includes an immobilizer-unit control interface 113. As mentioned above, the immobilizer unit in the vehicle can disable the vehicle. The automobile tracking and notification device 100 can send a signal to the vehicle's immobilizer unit via the immobilizer-unit control interface 113. The signal causes the immobilizer unit to disable the vehicle.

The automobile tracking and notification device 100 cannot be manually disabled in the vehicle without completely removing it. The device may be physically installed anywhere in the vehicle, but locations that make it completely inaccessible would be more effective in preventing removal of the device by a would-be thief. The only way to disable the auto tracker device is through the mobile application and or web-based user interface.

The automobile tracking and notification device 100 may be connected to the vehicle's main power supply (i.e., battery and/or alternator) through the power input 111. In addition, the automobile tracking and notification device 100 may be connected to an auxiliary power supply 109 that is used for standby power and/or backup power through the auxiliary power input 108. The auxiliary power supply 109 may be any type of power supply suitable for use in an automobile. In some embodiments, for example, the auxiliary power supply may be a lithium-ion battery pack or a lithium polymer battery pack, similar to those used in laptop batteries and/or power banks, for example, a 50 k mAh power bank. The auxiliary power supply 109 recharges itself through its connection to the vehicle's power system via the power input 112 and/or the power input 108 when the vehicle is turned on and generating power. The auxiliary power supply 109 may be mounted to the vehicle using mounting brackets 114.

The automobile tracking and notification device 100 may optionally include a Bluetooth chip 104. If included in the device, the Bluetooth chip 104 "pairs" the automobile tracking and notification device 100 with the user's mobile phone when the user's phone is physically located in the vehicle. When the system recognizes that the user's mobile phone is inside the vehicle, the system does not send notifications to the mobile device because it assumes the user is aware of what is happening (since they are already in the vehicle). If included in the device, the Bluetooth chip 104, once paired with the mobile device, only operates in "transmit" mode and does not offer a traditional "receive" functionality. This is a security feature to minimize the chance of hacking because the chip cannot receive incoming information. The transmit-only functionality of the Bluetooth chip may be implemented in the chip's firmware or in the chip's software.

The automobile tracking and notification device 100 in accordance with this disclosure may be implemented by being integrated into a vehicle by the vehicle manufacturer. This disclosure does not require that the device be a separate device or that it be separately mounted in the vehicle.

The automobile tracking and notification device in accordance with this disclosure provides various convenience and safety functionalities to the user. These functionalities include, for example: (1) tracking the location of the vehicle; (2) disabling the vehicle when it is stolen; (3) reading and translating the vehicle's diagnostic codes; (4) providing an SOS beacon to authorities and/or family when the vehicle is in an accident; and (5) providing notifications relating to the vehicle to the user.

The functionality for tracking the location of the vehicle may be used in a number of situations. For example, when the vehicle is running but the user is not in the vehicle (e.g., when the user has loaned the vehicle to family and/or friends, or when the user leaves the vehicle with a valet), the automobile tracking and notification device tracks the location of the vehicle (using the embedded GPS chip) at periodic intervals. When the vehicle is turned off, the location is updated within the system so that the system knows where the vehicle was parked/left (so that the user can later find it). When the vehicle is not running, the automobile tracking and notification device enters "standby" mode and continues to track the location of the vehicle (using the embedded GPS chip) at periodic intervals. When the automobile tracking and notification device is in standby mode, it continues to check the vehicle's location periodically (e.g., every minute), and if the vehicle has moved from its last-known location, then the device assumes that the vehicle is either being stolen or being towed. When the vehicle has not moved, the device sends location updates to the system at periodic intervals (e.g., every 10 minutes), although the actual location check may be more frequent than that. This rate at which the location updates are sent while in standby can be set by the user through the mobile application and/or the web-based user interface. If the automobile tracking and notification device does detect movement (via the GPS chip) while the vehicle is off, the automobile tracking and notification device send a notification, via the cellular connection, to the system. Upon receiving such a notification, the system generates and sends a distress message to the user that their vehicle is likely being stolen and/or towed.

When the automobile tracking and notification device is in standby mode, it will activate in response to a user request (via the mobile application or the web-based user interface) for the vehicle's location. More specifically, when the user requests the vehicle's location in the mobile application or the web-based user interface, the system receives the request, and then generates and sends a request to the automobile tracking and notification device over the cellular network. The device receives the request, and then generates and sends a notification that includes the vehicle's location to the system.

The functionality for disabling the vehicle may be used to disable the vehicle in a number of different situations. As one example, if the automobile tracking and notification device detects that the vehicle is being stolen, it will notify the user that it has detected vehicle activity that indicates that the vehicle is being stolen. The user will have the option to respond to the notification by telling the device to disable the vehicle. In some embodiments, the device will not disable the vehicle until it receives affirmative confirmation from the user to disable the vehicle. In some embodiments, the device will disable the vehicle without waiting for a response from the user. To disable the vehicle, the device will send a disable signal over the device's immobilizer-unit interface to the vehicle's immobilizer unit, which will cause the vehicle to be disabled so that the thief can no longer drive it. As another example, if the device detects that somebody has overridden the vehicle's on-board computer system, the device will send a disable signal over the device's immobilizer-unit interface to the vehicle's immobilizer unit. In one embodiment, the device will not send the disable signal until the vehicle is not moving (so that the vehicle does not become disabled while being driven on the highway, for example). Once the automobile tracking and notification device has disabled the vehicle (via the immobilizer unit), the vehicle will no longer be able to be started (by any means) until it is unlocked by the vehicle's owner, via the mobile application or the web-based interface.

In addition to the above, the automobile tracking and notification device may disable the vehicle in response to a command received from the user, regardless of whether the device has detected that the vehicle is being stolen. This may occur, for example, if the user is driving the vehicle and is "car-jacked" at a stoplight. Because the vehicle is running at that time, the device may not detect that the vehicle has been stolen, but the user may send a disable signal to the device through the system.

For the vehicle to be able to be disabled, the automobile tracking and notification device must have the same VIN and read the VIN of the car itself. The device may also recognize when a foreign device is attempting to start the vehicle. From an administrative perspective, the automobile tracking and notification device may include a so-called brake code that can be used in the event the vehicle needs to be repossessed, such that the vehicle can be started even if the device has disabled the vehicle. In addition, the brake code acts as a signal to the system to disable the user's account (since the vehicle is being repossessed). In one embodiment, the brake code is implemented at the system level such that the person who is repossessing the vehicle can log in to the system and enter the necessary override information there.

Modern automobiles often include a transponder in each of the keys or key fobs. The transponder is part of a security system that prevents the vehicle from being started without having the key/key fob present in the car. This is to prevent hot-wiring of the automobile. These vehicles, however, often include an override code (which, in some cases, is entered by tapping the brake pedal in a predefined pattern) that is specific to the vehicle and is known only to the automobile manufacturer (and stored in the vehicle's electronic control module). The override code allows the car to start without the transponder being present, as may be required, for example, when repossessing the vehicle. The automobile tracking and notification device may be configured to accept a similar override code that can be entered into the system to allow the vehicle to start when the system has otherwise disabled the automobile.

The functionality for reading and translating the vehicle's diagnostic codes may be used to provide the user with helpful real-time data relating to the vehicle's diagnostic codes. When automobile tracking and notification device receives/reads a DTC from the vehicle's on-board diagnostics system, it sends the DTC to the back-end system over the cellular connection. The back-end system then "translates" the DTC into simple-to-understand information for the user and sends it to the user over a connection to the mobile device and/or web-based interface. The "translation" may let the user know what the specific issue is (in wording the user can understand), the importance of the user addressing the issue (e.g., whether continuing to drive is ok, or whether it will lead to permanent damage of the car), the drivability and urgency of the issue. In addition, the back-end system stores the DTCs in the database associated with the user, so that they can be accessed/reviewed in the future.

The functionality for providing an SOS beacon to authorities and/or family when the vehicle is in an accident may be used to help interested parties locate the vehicle. When the automobile tracking and notification device detects that the vehicle's airbags have been deployed (either from the vehicle's on-board computer or the vehicle's safety-restraint system), the device sends a notification (referred to as an SOS beacon) that includes the vehicle's last-known GPS location to the back-end system over the cellular connection, and the back-end system generates and sends an appropriate notification to the local authorities (e.g., police, fire, EMS, etc.). The notification sent to the local authorities may include the location of the vehicle when the airbags were deployed, the make, model, and year of the vehicle, the user's information, the VIN of vehicle, the license plate number of the vehicle, and the driver's license number of the user. In one embodiment, the notification is sent from the automobile tracking and notification device to the system via the cellular connection. The system interprets the notification, and generates and sends the notification to the authorities.

The functionality for providing a "stolen" notification to the police when the vehicle is stolen (or the user believes the vehicle is stolen) allows the automobile tracking and notification device to alert authorities when the vehicle is stolen. As explained above, the device may detect when the vehicle is being stolen, or the user may unilaterally indicate to the device that the vehicle is being stolen (through the mobile application or the web-based interface). When the "stolen" indicator is received (either from the device or from the user), the system generates and sends a notification to the police. The notification sent to the police may include the last-known location of the vehicle, the make, model, and year of the vehicle, the user's information, the VIN of vehicle, the license plate number of the vehicle, and the driver's license number of the user. In addition, once the "stolen" indicator has been triggered, the automobile tracking and notification device will continue to send location updates sent periodically (e.g., every 10 seconds). The GPS chip on the automobile tracking and notification device is generally accurate to within a 5-meter radius. Once the "stolen" call has been triggered, the application automatically unlocks to provide access to the authorities (e.g., police, fire, EMS, etc.) so that the authorities can track the device in nearly real-time (i.e., every 10 seconds, or other interval set in the settings by the user).

The functionality for providing notifications to the user may cover numerous various scenarios. For example, as explained above, the automobile tracking and notification device may notify the user of the vehicle's location. The device may notify the user of the vehicle's movements. The device may notify the user if the vehicle is being stolen. The device may notify the user if the vehicle is being towed. The device may notify the user if the vehicle's airbags have been deployed. The device may notify the user of the vehicle's DTC code(s). The device may notify the user if the vehicle's alarm has been triggered. The device may notify the user if the device's auxiliary power supply is running low and/or is about to die.

For any/all of these notifications that the automobile tracking and notification device sends, the device sends the notification to the back-end system (e.g., one or more server running in the cloud) over the device's cellular connection. Once received, the system handles the notification accordingly. The system will log the notification for future review/ use. In addition, the system will act on the notifications accordingly, which may include, for example, forwarding the notification to the user (via the mobile application and/or the web-based user interface) and waiting for a response from the user.

Figure 2:
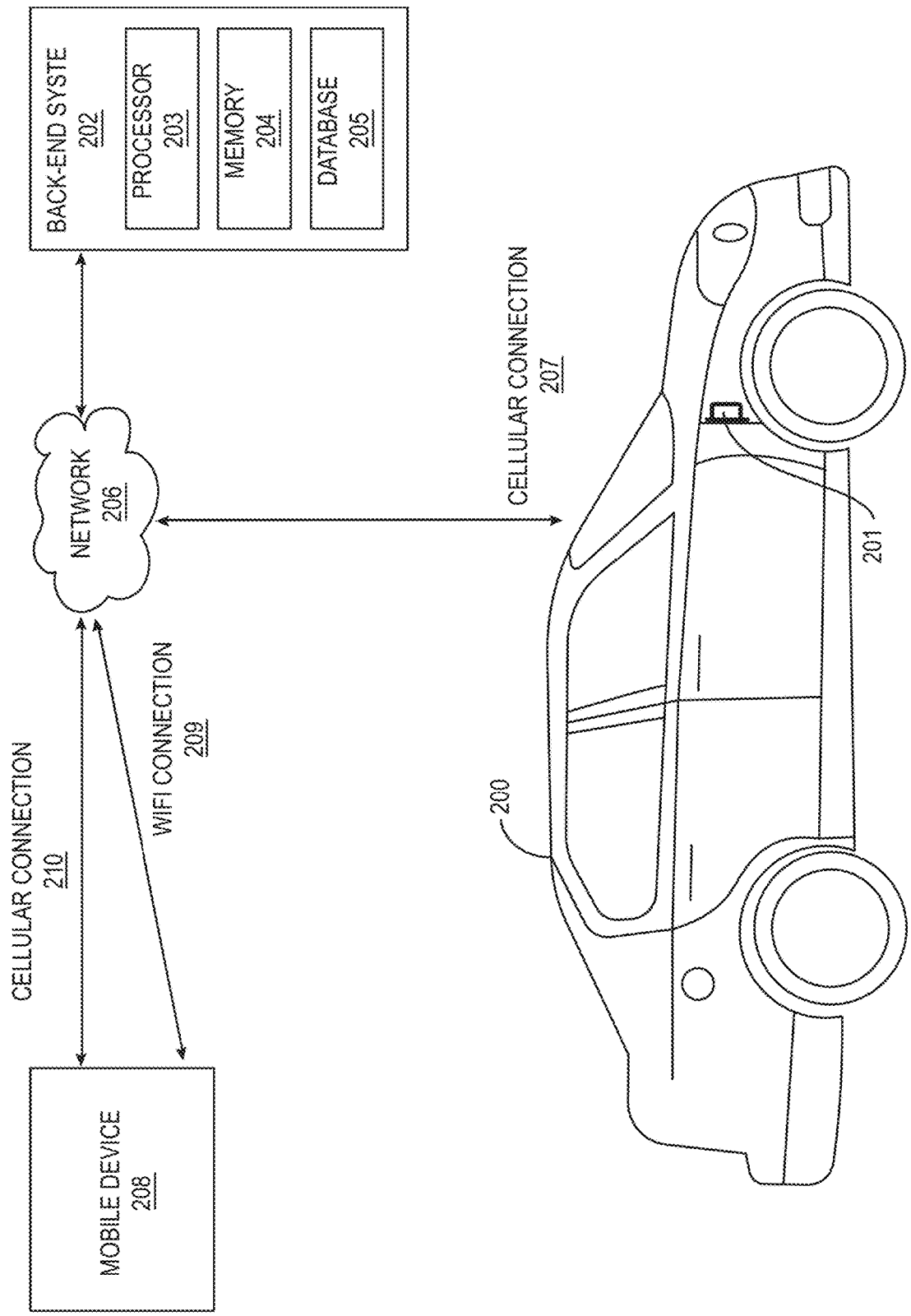
FIG. 2 depicts an example of the automobile tracking and notification device installed in a vehicle.

FIG. 2 depicts an example of the automobile tracking and notification device installed in a vehicle.

The automobile tracking and notification device 201 is mounted in vehicle 200. The automobile tracking and notification device 201 is connected to network 206 over cellular connection 207. The cellular connection is provided by a SIM card and/or cellular transceiver in the automobile tracking and notification device 201. The automobile tracking and notification device 201 is connected to the power system of the vehicle 200. The automobile tracking and notification device 201 is also connected to an auxiliary power supply.

The automobile tracking and notification device 201 communicates over network 206 with back-end system 202, which provides processing of communications with the automobile tracking and notification device 201. Back-end system 202 communicates over network 206 with mobile device 208. The mobile device 208 may be any commercially available device, such as, for example, cellular phones (e.g., Apple iPhone, Android devices) and network-enabled devices (e.g., desktop computer, laptop computer, tablets, netbooks, 2-in-1 computers, etc.). The mobile device 208 may communicate over a wireless connection 209 (e.g., 802.11 WiFi, Bluetooth, etc.) or a cellular connection 210.

Back-end system 202 includes a processor 203, a memory 204, and a database 205. The processor 203 may be any type of processor known in the art to be suitable for servers. The memory 204 may be any type of memory known in the art to be suitable for servers. The database 205 may be part of back-end system 202, or it may be made up of one or more separate units that are communicatively coupled to form back-end system 202. The back-end system 202 may include "cloud" functionality for managing multiple data repository and/or computer functions that are distributed across multiple physical servers. As such, it is envisioned that the system may be implemented in the cloud and/or be cloud-based. In one embodiment, the back-end system 202 may be implemented using Amazon Web Services ("AWS"). The back-end system 202 may run any operating system or embedded software. In one embodiment, the back-end system 202 may run a Linux-based operating system.

Figure 3:
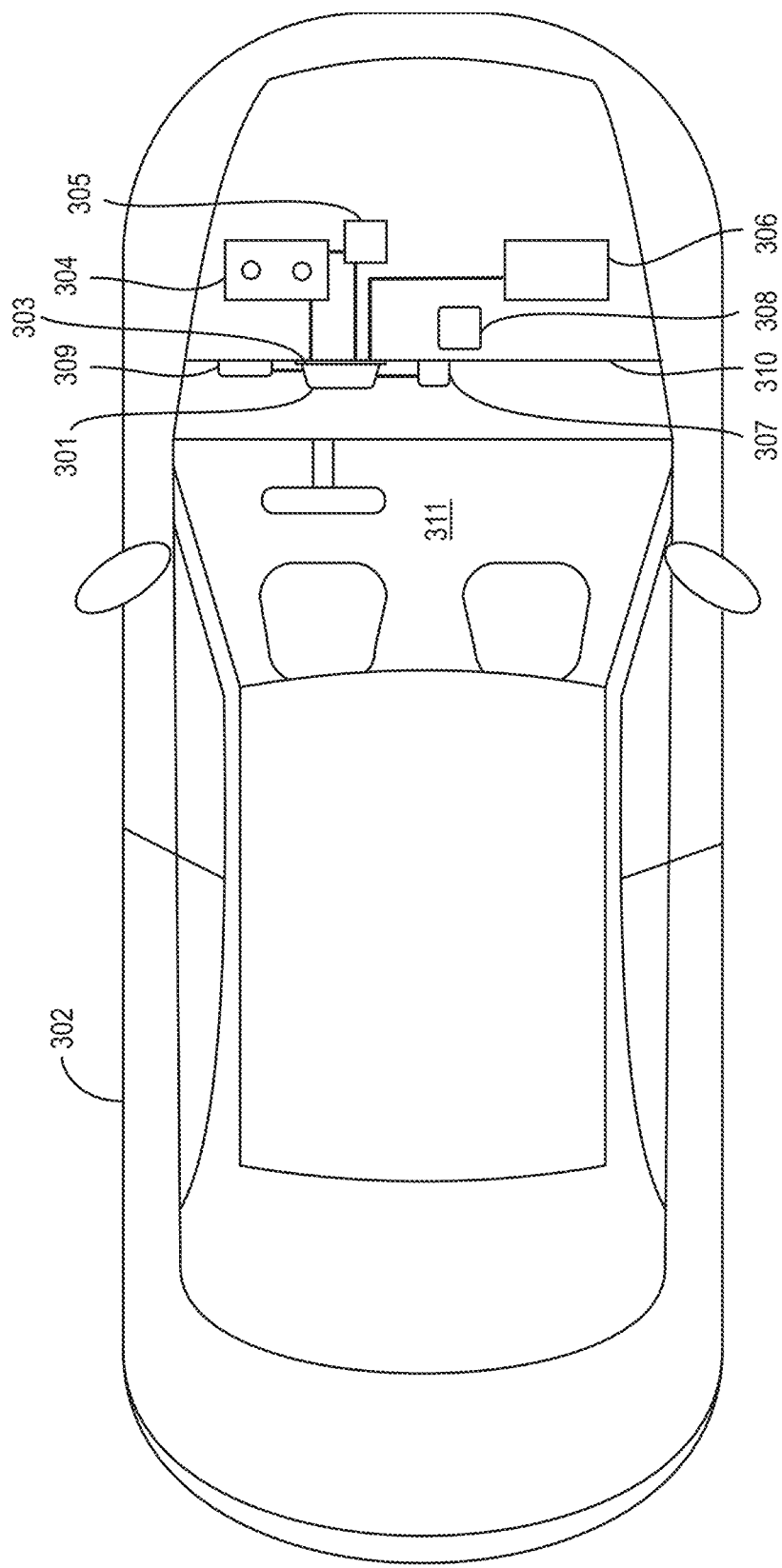
FIG. 3 depicts an example of the automobile tracking and notification device installed in a vehicle.

FIG. 3 depicts an example of the automobile tracking and notification device installed in a vehicle.

The automobile tracking and notification device 301 may be installed anywhere in the vehicle 302, depending on the layout of the vehicle and other considerations. In one embodiment, the automobile tracking and notification device 301 is mounted on the vehicle's firewall, behind the dash 311, facing the interior of the vehicle, as shown in FIG. 3.

The automobile tracking and notification device 301 may be mounted to the vehicle's firewall 310 through the device's mounting bracket. The automobile tracking and notification device 301 is connected to the vehicle's alternator 305, which is connected to the vehicle's battery 304, as a power supply. The automobile tracking and notification device 301 is further connected to the auxiliary power supply 307. The auxiliary power supply 307 may be mounted to the vehicle's firewall 310 through the mounting bracket of the auxiliary power supply, near the device itself.

As explained above, the automobile tracking and notification device 301 is connected to the vehicle's on-board diagnostics system via the OBD-II interface 309, either through the vehicle's OBD-II port or through a direct connection to the on-board diagnostics system (such that the device does not impede the normal use of the vehicle's OBD-II port). The connection to the on-board diagnostics system allows for the device to read DTCs from the vehicle.

The automobile tracking and notification device 301 may also be connected to the vehicle's on-board computer 306. Whether the device is connected to the vehicle's on-board computer separately from being connected to the vehicle's on-board diagnostics system may be determined on a per-vehicle basis. In some vehicles, systems may be the same as the on-board computer, and in that case, only one connection is needed.

The automobile tracking and notification device 301 is connected to the immobilizer unit 308 of the vehicle 302. Through this connection, the device 301 may issue a command to the immobilizer unit to disable the vehicle, as explained above.

Figure 4:
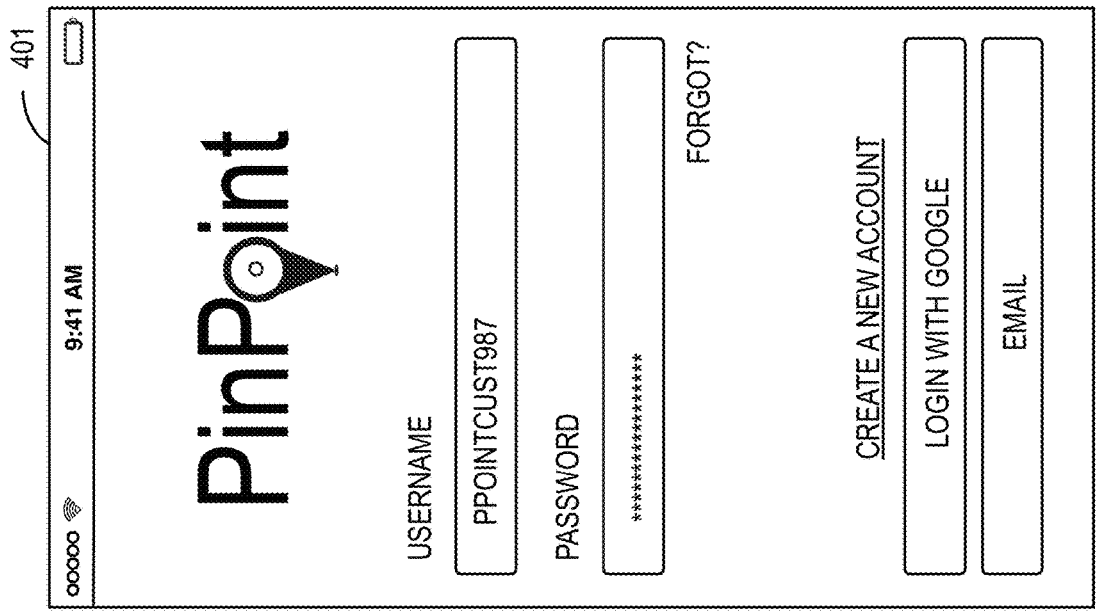
FIG. 4 depicts an example of a user's User Login screen of the mobile application for the automobile tracking and notification device.

FIG. 4 depicts an example of a user's User Login screen of the mobile application for the automobile tracking and notification device. The example shown is just one example, and the functionality described herein may be implemented in any graphical format, whether as part of a mobile application or as part of a web-based user interface.

The User Login screen 401 provides the user the ability to log in if they already have an account. The login may be performed with a username and a password, or it may be performed using a fingerprint authentication or face authentication. The user login screen 401. If the user does not yet have an account, login screen 401 may allow the user to create a new account.

Figure 5:
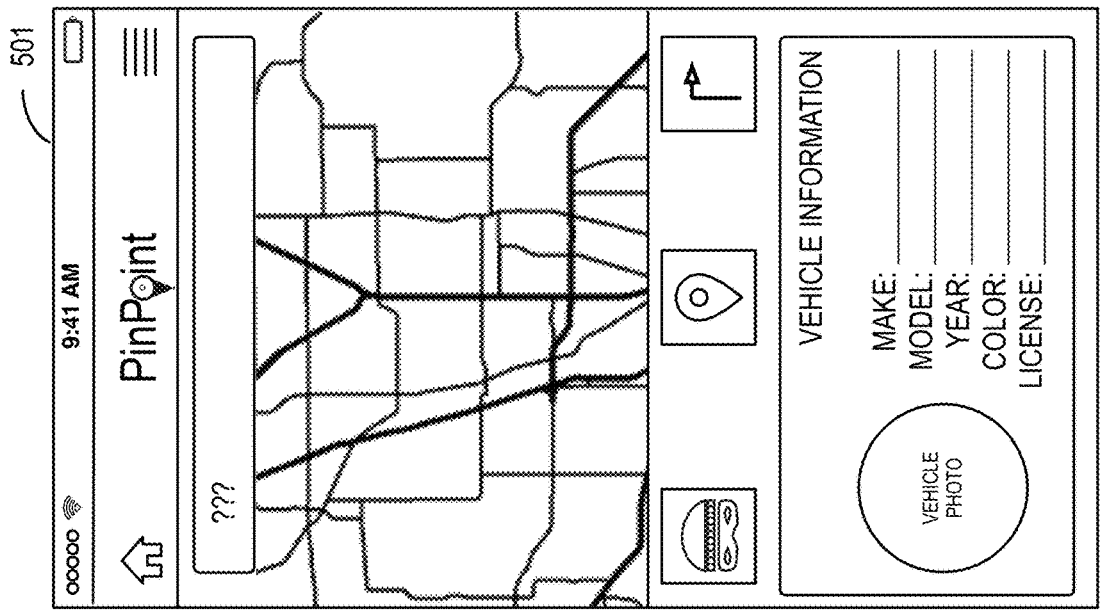
FIG. 5 depicts an example of a user's User Home screen of the mobile application for the automobile tracking and notification device.

FIG. 5 depicts an example of a user's User Home screen of the mobile application for the automobile tracking and notification device. The example shown is just one example, and the functionality described herein may be implemented in any graphical format, whether as part of a mobile application or as part of a web-based user interface.

The User Home screen 501 shows the location of the user's vehicle, along with the vehicle information, which includes the vehicle's make, model, year, color, and the user's license number. The User Home screen 501 may further provide the user with the option to report their vehicle stolen, find the location of their vehicle, and/or get directions to the location of the vehicle.

Figure 6:
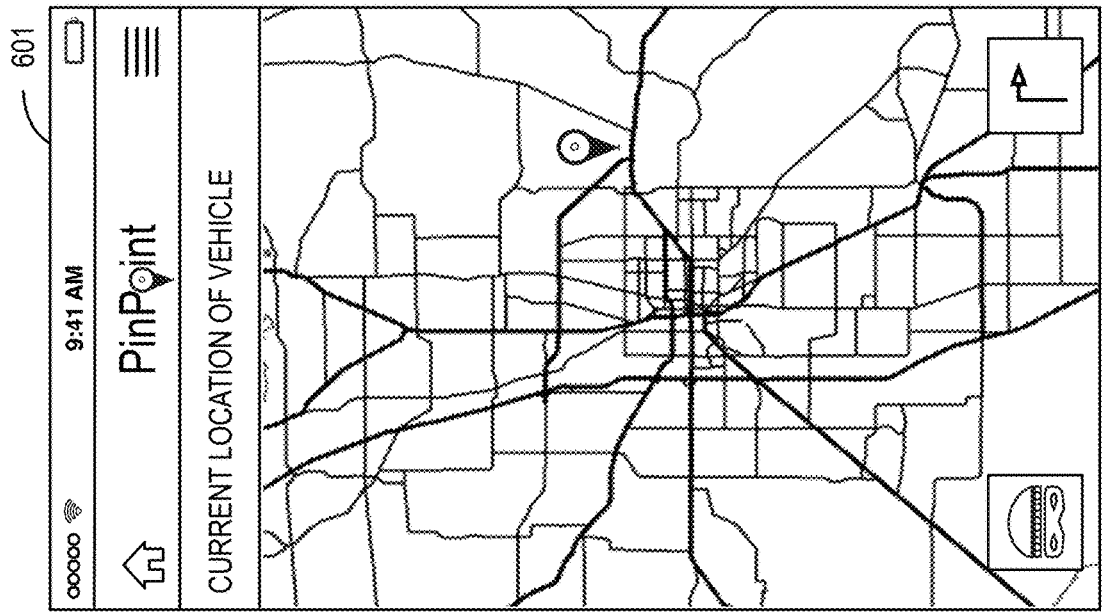
FIG. 6 depicts an example of a user's GPS Map screen of the mobile application for the automobile tracking and notification device.

FIG. 6 depicts an example of a user's GPS Map screen of the mobile application for the automobile tracking and notification device. The example shown is just one example, and the functionality described herein may be implemented in any graphical format, whether as part of a mobile application or as part of a web-based user interface.

The GPS Map screen 601 allows the user to find their vehicle anywhere/anytime, and to get GPS directions to where the user left it, or in the event of being towed, to know where it was towed to. The GPS Map screen 601 provides a map showing the current or last known location of the vehicle being tracked. The GPS Map screen 601 may provide the user the option to get directions from the location of the mobile device (i.e., the user's current location) to the location of the vehicle being tracked. The GPS Map screen 601 may further provide the user the option to report the vehicle to the police as stolen. If the user selects the option to report the vehicle to the police as stolen, a notification signal is sent from the mobile device to the back-end system, which then generates a report and sends the report to the local authorities. The back-end system can search the internet based on the received location to identify the proper authorities to locate and to get the proper notification channel (i.e., the phone number, email address, etc.).

Figure 7:
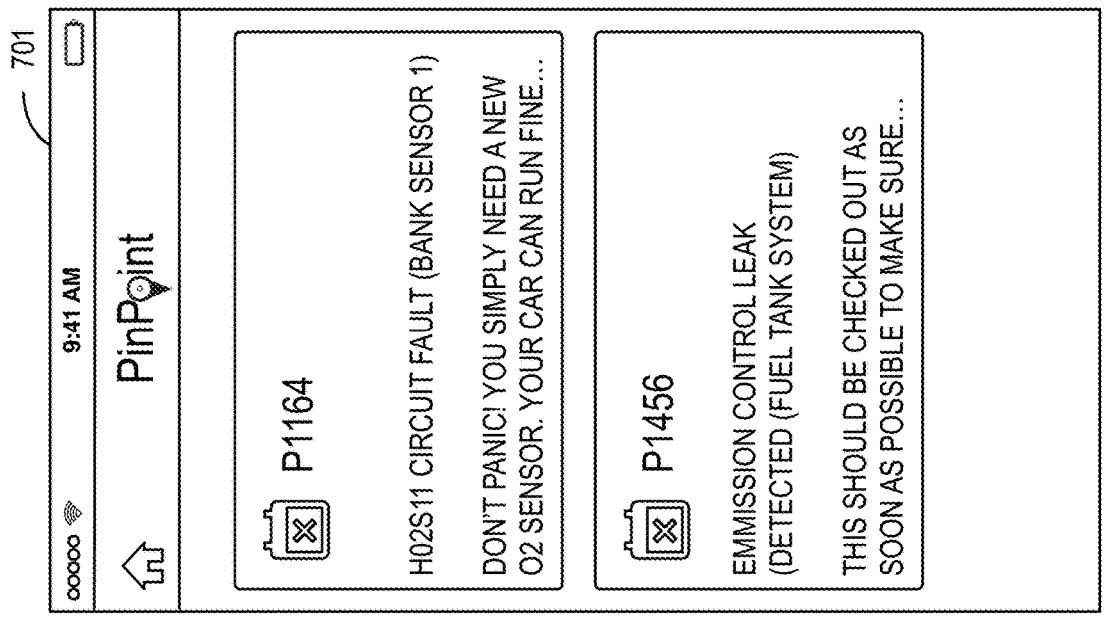
FIG. 7 depicts an example of a user's Vehicle Diagnostics screen of the mobile application for the automobile tracking and notification device.

FIG. 7 depicts an example of a user's Vehicle Diagnostics screen of the mobile application for the automobile tracking and notification device. The example shown is just one example, and the functionality described herein may be implemented in any graphical format, whether as part of a mobile application or as part of a web-based user interface.

The Vehicle Diagnostics screen 701 displays one or more DTC codes received from the vehicle's on-board diagnostics system. The DTC codes are sent from the on-board diagnostics system to the automobile tracking and notification device, and then from the device to the back-end system, which then translates the DTC codes into understandable information, and sends that information to the mobile device. The back-end system may include additional information stored in the database that can be used for looking up and translating the codes into understandable information. The understandable information may include a suggestion for how the owner/operator of the vehicle should address the code, and the urgency/importance of doing so.

Figure 8:
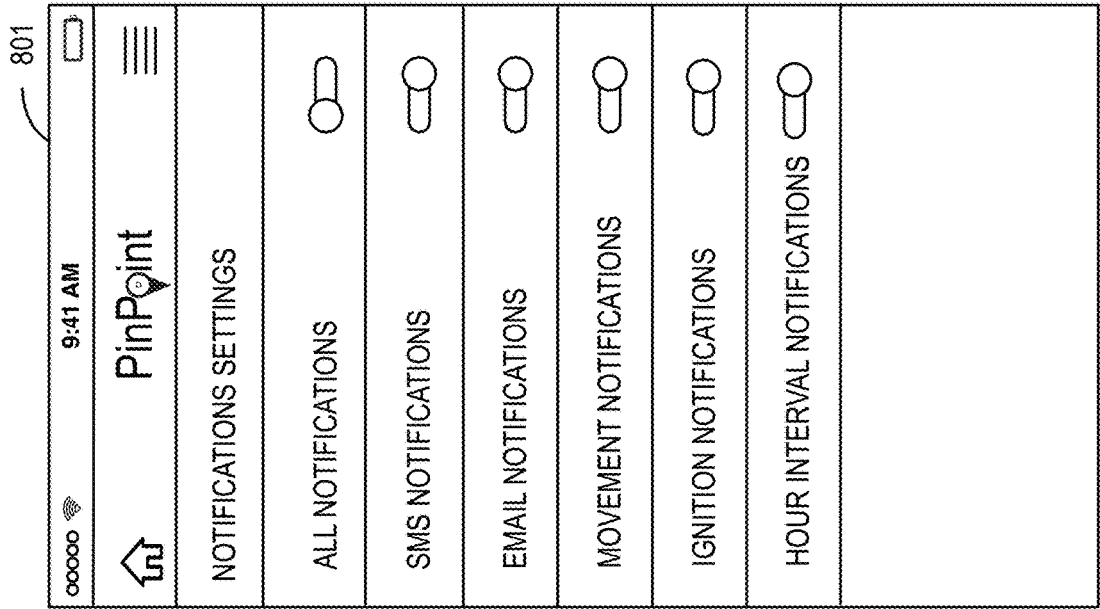
FIG. 8 depicts an example of a user's Notification Settings screen of the mobile application for the automobile tracking and notification device.

FIG. 8 depicts an example of a user's Notification Settings screen of the mobile application for the automobile tracking and notification device. The example shown is just one example, and the functionality described herein may be implemented in any graphical format, whether as part of a mobile application or as part of a web-based user interface.

The Notification Settings screen 801 allows the user to set which notifications, if any, that the user would like to receive, and how the user would like to receive them. The system may provide various types of notifications to the user, and it may provide the notifications to the user via email, text (SMS) message, and/or directly through the mobile application.

The Notification Settings screen 801 allows the user to turn "All Notifications" on or off. When the "All Notifications" setting is on, all incoming notifications are provided to the user over email, text (SMS) message, and directly through the mobile application. When the "SMS Notifications" setting is on, all incoming notifications are provided to the user through text (SMS) messages. When the "Email Notifications" setting is on, all incoming notifications are provided to the user through email messages. When the "Movement Notifications" setting is on, incoming notifications relating to movement of the vehicle are sent to the user. Movement notifications may include notifications that tell the user any time the vehicle has moved when the user is not in the car (e.g., when the user has loaned their car to somebody else, or when the car is being stolen. When the "Ignition Notifications" setting is on, incoming notifications indicating when the ignition is turned on are sent to the user. When the "Hour Interval Notifications" setting is on, incoming notifications are provided to the user every hour.

The notifications sent to the user are sent via the selected communication methods determined by the settings.

The notification settings are sent from the mobile device to the back-end system, where they are implemented. The server-side implementation of the notification settings allows for them to be updated at any time, and the back-end system can maintain logs of information relating to the vehicle even when notifications are not sent to the mobile device.

Figure 9:
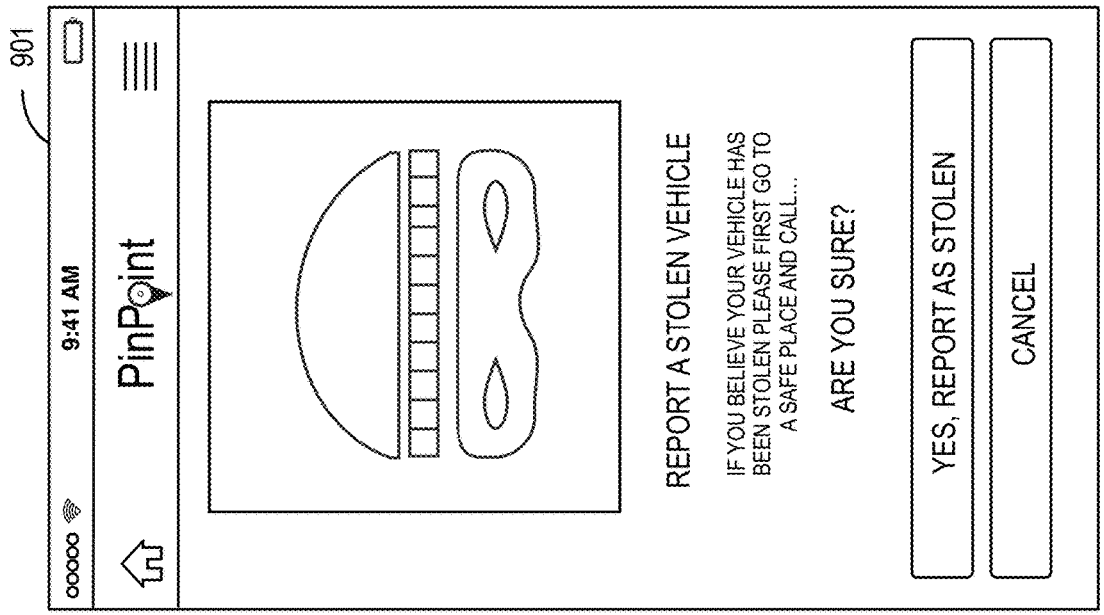
FIG. 9 depicts an example of a user's Report Stolen screen of the mobile application for the automobile tracking and notification device.

FIG. 9 depicts an example of a user's Report Stolen screen of the mobile application for the automobile tracking and notification device. The example shown is just one example, and the functionality described herein may be implemented in any graphical format, whether as part of a mobile application or as part of a web-based user interface.

The "Report Stolen" screen 901 allows the user to report their vehicle stolen. As explained above in the context of the GPS Map screen, if the user selects the option to report the vehicle to the police as stolen, a notification signal is sent from the mobile device to the back-end system, which then generates a report and sends the report to the local authorities.

Figure 10:
FIG. 10 depicts an example of a user's Vehicle Information screen of the mobile application for the automobile tracking and notification device.

FIG. 10 depicts an example of a user's Vehicle Information screen of the mobile application for the automobile tracking and notification device. The example shown is just one example, and the functionality described herein may be implemented in any graphical format, whether as part of a mobile application or as part of a web-based user interface.

The Vehicle Information screen 1001 shows any linked vehicles in the user's account. From the Vehicle Information screen 1001, the user can add or delete a vehicle from the account. The information for the vehicle includes information such as the vehicle make, model, year, color, license plate number, and a photo of the vehicle.

Figure 11:
FIG. 11 depicts an example of a user's User Profile screen of the mobile application for the automobile tracking and notification device.

FIG. 11 depicts an example of a user's User Profile screen of the mobile application for the automobile tracking and notification device. The example shown is just one example, and the functionality described herein may be implemented in any graphical format, whether as part of a mobile application or as part of a web-based user interface.

The User Profile screen 1101 shows information about the user of the account. This information may include, for example, a username, the user's full name, the user's address, the user's phone number, the user's email address, the user's driver's license number, the legal owner of the vehicle, and the user's insurance information. From the User Profile screen 1101, the user may edit the user's profile information.

Figure 12:
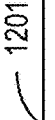
FIG. 12 depicts an example of a user's Location History screen of the mobile application for the automobile tracking and notification device.

FIG. 12 depicts an example of a user's Location History screen of the mobile application for the automobile tracking and notification device. The example shown is just one example, and the functionality described herein may be implemented in any graphical format, whether as part of a mobile application or as part of a web-based user interface.

The Location History screen 1201 shows a list of locations where the vehicle has been over a defined amount of time (e.g., over the last 24 hours).

Figure 13:
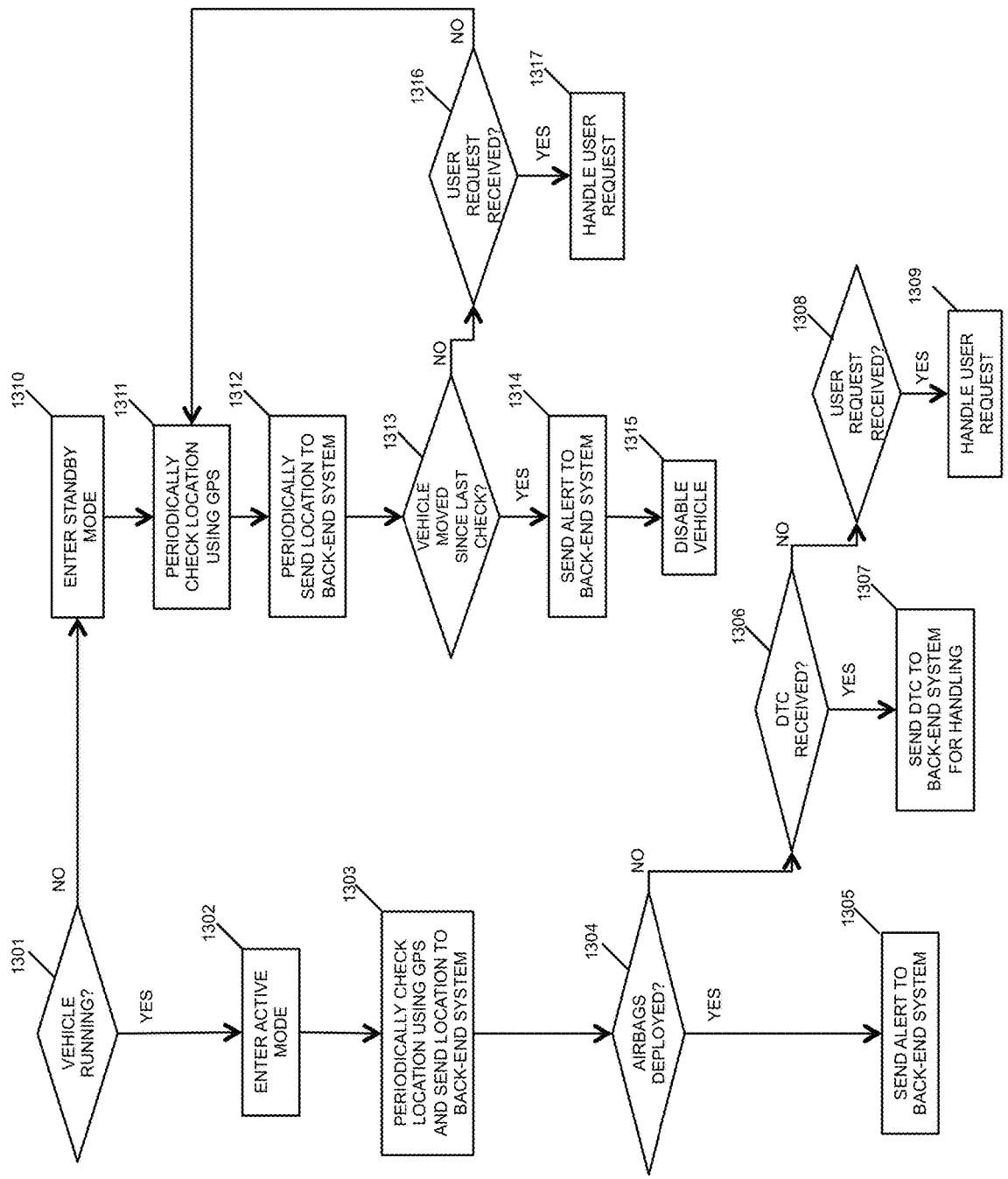
FIG. 13 depicts a flowchart showing an example of operation of the automobile tracking and notification device.

FIG. 13 depicts a flowchart showing an example of operation of the automobile tracking and notification device.

At step 1301, the automobile tracking and notification device checks whether the vehicle is running. The device may determine whether the vehicle is running in a number of ways. As one example, the device may determine whether the vehicle is running based on its connection to the vehicle's power system—when the power system is providing power, the device can assume the vehicle is running. As another example, the device may determine whether the vehicle is running based on its connection to the vehicle's on-board computer—the on-board computer provides a signal indicating the vehicle is running.

If the vehicle is running, the device enters operational (or active) mode, at step 1302. When the vehicle is running, the device periodically checks the location of the vehicle using the device's GPS chip, at step 1303. The period for checking the location may be set by the user, or it may be determined by the device. At step 1303, the device also sends the location of the vehicle to the back-end system (via the device's cellular connection), which adds the location to the vehicle's location log (which may be stored, for example, in the database).

As step 1304, the automobile tracking and notification device checks whether the airbags have been deployed. As explained above, the device may make this determination based on information from the vehicle's on-board computer (e.g., via the vehicle's SRS system). If the airbags have been deployed, the device sends an alert (that includes the vehicle's location) to the back-end system (via the cellular connection), at step 1305. The back-end system processes and handles the alert—for example, by alerting local authorities of an accident. In some embodiments, the system may also alert the user's family or friends, according to the user's settings.

If the airbags have not been deployed, the device checks whether it has received a DTC code from the vehicle, at step 1306. If the device has received a DTC code from the vehicle, the device sends the DTC code to the back-end system (via the cellular connection), at step 1307. The back-end system processes and handles the DTC code—for example, by translating the DTC code and providing the user with easy-to-understand instructions to address the DTC code.

If the automobile tracking and notification device has not received a DTC code from the vehicle, the device checks whether it has received a user request. A user request may include, for example, a request for the location of the vehicle or a request to disable the vehicle. If the device has received a user request, the device handles the user request, at step 1309. If the device has not received a user request, the device continues to periodically check and send the vehicle's location using the GPS (i.e., returns to step 1303).

If the vehicle is not running, the device enters standby mode, at step 1310. As explained above, when the device is in standby mode, it runs off of an auxiliary power supply. When the vehicle is not running, the device periodically checks the location of the vehicle using the device's GPS chip, at step 1311. The period for checking the location may be set by the user, or it may be determined by the device. Since the device is in standby mode, the period for checking the vehicle's location may be longer than when the device is active (since the vehicle is assumed to be stationary when the device is in standby mode). At step 1312, the device periodically sends the location of the vehicle to the back-end system (via the device's cellular connection), which adds the location to the vehicle's location log (which may be stored, for example, in the database). The period for sending the location to the back-end system may be longer than the period for checking the vehicle's location when the device is in standby.

At step 1313, the device determines whether the vehicle has moved since the last periodic location check. Because the device is in standby mode (i.e., the vehicle is not running), the device expects the vehicle to not have moved. If the vehicle has moved since the last location check, the device sends an alert (via the cellular connection) to the back-end system for processing, at step 1314. The back-end system may process the alert by notifying the user and/or notifying the local authorities. At step 1315, the device disables the vehicle by sending a signal to the vehicle's immobilizer unit.

At step 1316, the device checks whether it has received a user request. A user request may include, for example, a request for the location of the vehicle or a request to disable the vehicle. If the device has received a user request, the device handles the user request, at step 1317. If the device has not received a user request, the device continues to check periodically check the location using the GPS (i.e., returning to step 1311).

In the context of this disclosure, a notification can mean many things, as will be understood by a person skilled in the art. For example, a notification may include updating the mobile application and/or web-based user interface such that the user sees it next time they log in to the app/user interface. As another example, a notification may include sending a separate notification to the user through the mobile application. As another example, a notification may include sending an email to the user being notified. As another example, a notification may include sending a text message to the user being notified.

It will be appreciated that the systems, methods, and apparatuses described herein may be implemented using various types of user interfaces, such as user interfaces that allow the users to log in and update their profile, availability, etc. For example, as explained above, the user interface may be implemented in a mobile app, or on a web browser.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium (including, but not limited to, non-transitory computer readable storage media). A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including object oriented and/or procedural programming languages. Programming languages may include, but are not limited to: Ruby®, JavaScript®, Java®, Python®, PHP, C, C++, C #, Objective-C®, Go®, Scala®, Swift®, Kotlin®, OCaml®, or the like. The program code may execute entirely on the user's computer, partly on the user's computer, as a stand-alone software package, partly on the user's computer, and partly on a remote computer or entirely on the remote computer or server. In the latter situation scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. An automobile tracking and notification device associated with a vehicle for tracking the vehicle, comprising:
    a memory to store at least instructions that are executed by a processor of the device;
    a GPS chip to determine a location of the device, wherein the location of the device represents the location of the vehicle;
    the processor to track the location of the device based on information from the GPS chip and generate notifications related to an operation of the vehicle based on said information;
    a Bluetooth transceiver to wirelessly connect to a mobile device associated with the owner of the vehicle when the mobile device is located inside the vehicle;
    a cellular transceiver to transmit the notifications related to the operation of the vehicle to the mobile device, wherein the notifications are not transmitted to the mobile device when the mobile device is located inside the vehicle and is connected wirelessly to the Bluetooth transceiver;
    a communications interface to communicate with one or more computer systems of the vehicle, the communications interface including an immobilizer-unit control interface to provide a disable signal to an immobilizer unit of the vehicle to disable the vehicle while the engine is running but the vehicle is not moving in response to the notifications; and
    a power input to receive power from the vehicle's power system;
    wherein the automobile tracking and notification device includes an associated unique identification code hard-coded into hardware of the automobile tracking and notification device to associate the device with the vehicle, the associated unique identification code being based on a vehicle identification number (VIN) of the vehicle.

2. The automobile tracking and notification device of claim 1, wherein the immobilizer-unit control interface provides the disable signal to the immobilizer unit of the vehicle in response to the automobile tracking and notification device detecting that the vehicle has been or is in the process of being stolen.

3. The automobile tracking and notification device of claim 1, wherein the communications interface includes an interface to communicate with an on-board diagnostics system port of the vehicle to receive one or more diagnostic codes from the vehicle.

4. The automobile tracking and notification device of claim 1, wherein the communications interface includes an interface to communicate with the vehicle's on-board computer to receive information relating to the operation of the vehicle.

5. The automobile tracking and notification device of claim 1, further comprising an auxiliary power supply for standby power or backup power of the device.

6. The automobile tracking and notification device of claim 1, further comprising a mounting bracket for mounting the device in the vehicle.

\* \* \* \* \*